United States Patent [19]

Stepanski et al.

[11] Patent Number: 5,249,898
[45] Date of Patent: Oct. 5, 1993

[54] COMPOSITE ANCHOR INCORPORATING A WATER-CURING POLYMER COMPOSITION

[75] Inventors: Horst Stepanski, Leverkusen; Günter Arend, Dormagen; Bernard Jansen, Cologne, all of Fed. Rep. of Germany

[73] Assignee: Bayer Aktiengesellschaft, Leverkusen, Fed. Rep. of Germany

[21] Appl. No.: 868,384

[22] Filed: Apr. 14, 1992

[30] Foreign Application Priority Data

Apr. 17, 1991 [DE] Fed. Rep. of Germany ....... 4112531

[51] Int. Cl.$^5$ ..................... F16B 39/00; F16B 39/02; E21D 20/00
[52] U.S. Cl. ..................... 411/82; 411/258; 405/259.6; 285/915
[58] Field of Search ............ 411/82, 257, 258; 405/259.6, 263; 166/295; 285/915

[56] References Cited

U.S. PATENT DOCUMENTS

| | | | |
|---|---|---|---|
| 2,321,761 | 6/1943 | Mathis et al. | 166/295 |
| 3,052,583 | 9/1962 | Carlstrom et al. | 166/295 |
| 4,263,832 | 4/1981 | Lang et al. | 411/82 |
| 4,534,795 | 8/1985 | Lewis et al. | 405/259.6 |
| 5,048,608 | 9/1991 | Wiser-Halladay et al. | 166/295 |
| 5,104,266 | 4/1992 | Daryoush et al. | 411/82 |

FOREIGN PATENT DOCUMENTS

| | | |
|---|---|---|
| 629335 | 4/1936 | Fed. Rep. of Germany . |
| 2625492 | 12/1977 | Fed. Rep. of Germany . |
| 3221046 | 12/1983 | Fed. Rep. of Germany . |
| 2096653 | 4/1970 | France . |
| 470761 | 8/1937 | United Kingdom . |

OTHER PUBLICATIONS

Mauthe, P., Neue Verbundaner-Generation mit Epoxyacylat, Schweizer Ingeniur und Architekt (1987, No. 13).

Lang, G., Festigketseigenschaften von verbundanker-Systemen, Bauingenieur 54 (1979) pp. 41–46.

Sell, R., Uber Fertigket und verformung mit Reaktionskarmortelpatronen versetzter Betonanker, Verbindugstecknik 5 (1973), No. 8, pp. 11–16.

Kloker, W., Auf Reaktionsharzbasis spreizdruckfrei veranker, verbindunstechnik 9 (1977), No. 9, pp. 37–42.

Schuermann, F. et al, Die Weiterentwicklung des klebeankers, Gluck auf, 106, (1970) s4 pp. 1145–1151.

Primary Examiner—Neill R. Wilson
Attorney, Agent, or Firm—Joseph C. Gil; N. Denise Brown

[57] ABSTRACT

Composite anchors for use in concrete or masonry are described. The anchor is a rod sheathed in a material which has been impregnated with a moisture-curing polyurethane resin.

9 Claims, 1 Drawing Sheet

COMPOSITE ANCHOR INCORPORATING A WATER-CURING POLYMER COMPOSITION

BACKGROUND OF THE INVENTION

The present invention relates to composite anchors bonded in place with water-curing polymer preparations for use in concrete or masonry and to a process for the production of corresponding composite anchors.

Known composite anchor systems are based on polymerizable compounds which are marketed in two-compartment glass cartridges, one compartment for the monomer and the other for the catalyst. These so-called mortar cartridges are introduced into a borehole. The anchor rod is then driven in by means of a percussion drill. The glass of the mortar cartridge is shattered and the reaction is initiated by thorough mixing of the components (cf. for example, Mauthe, P., Neue Verbundanker-Generation mit Epoxyacrylat, Schweizer Ingenieur und Architekt (1987), No. 13; Lang, G., Festigkeitseigenschaften von Verbundanker-Systemen, Bauingenieur 54 (1979) pages 41–46; Sell R., Ober Fertigkdit und Verformung mit Reaktionsharzmörtelpatronen versetzter Betonanker, Verbindungstechnik 5 (1973), No. 8, pages 11–16; Klöker, W., Auf Reaktionsharzbasis spreizdruckfrei verankern, Verbindungstechnik 9 (1977), No. 9, pages 37–42; and, Schuermann, F. et al, Die Weiterentwicklung des Klebeankers, Glück auf, 106, (1970) 24, pages 1145–1151)

At present, two chemically different systems are in use, namely, free radical-polymerizing unsaturated polyester resins, and free radical-polymerizing epoxyacrylates. One feature common to both systems is the ester function in the backbone of the polymer network which is vulnerable to hydrolysis.

DESCRIPTION OF THE INVENTION

Figure 1:
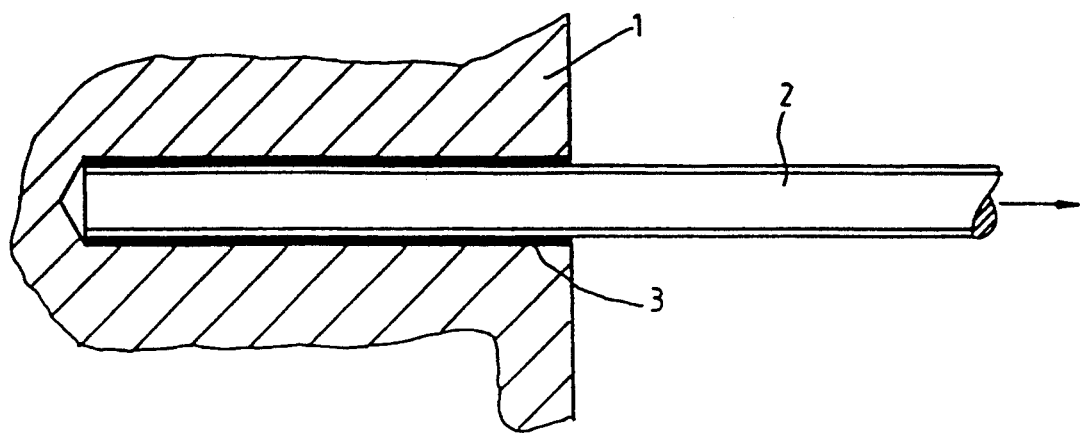
FIG. 1 represents one embodiment of the present invention.

The composite anchors of the invention consist of a rod, which is sheathed in a material which has been impregnated with a moisture-curing polyurethane resin. The rod can be constructed of a metallic material, a fiber composite or any other material having the strength characteristics necessary for use in concrete, masonry or rock. The preferred rods are made of alloyed or unalloyed steels. The material impregnated with the resin is preferably a textile material. The composite anchor of the invention is activated by immersion in water and may then be inserted into a bore of corresponding dimensions. The cure time of the polyurethane resin determines the length of time after which load can be applied to the anchor. After curing, the anchor has the requisite load-bearing capacity.

This is all the more remarkable to the expert insofar as water-curing polyurethane systems having a certain isocyanate content generally tend to foam through the evolution of $CO_2$. The cellular structure of the foam generally results in the drastic reduction in the strength properties. In the present invention, however, the resin is unable to foam freely because the available space is limited by the bore. After the available empty space has been filled, a foaming pressure builds up and, on the one hand, promotes thorough wetting and penetration of the bore surface while, on the other hand, counteracting further expansion. Only in the peripheral zones of the bond is monoaxial expansion possible, albeit to a minimal extent. By virtue of the considerable load-bearing length of the bond, the relatively low shear rigidity which this monoaxial expansion inevitably produces actually has a positive effect by breaking down stress peaks. This improves the load-bearing behavior both of the bond and of the anchor.

In addition, when polyether polyurethanes are used, the polymer is resistant to hydrolysis. This merits particular attention because concrete and mortar are highly alkaline.

The material impregnated with the polyurethane resin in accordance with the invention strengthens the resin and counteracts creeping under load. This effect is particularly pronounced if, for example, glass fibers are used in the material to be impregnated.

In manufacturing terms, sheathing the rod is easier than producing two-compartment glass cartridges. In conventional systems, careless work can cause errors through off-center insertion of the anchor. By contrast, the impregnatable material of the anchors according to the invention provides for safe centering.

Conventional mortar cartridges which have gelled through incorrect storage or damage can only be detected by careful examination. By contrast, the anchors according to the invention would be impossible to fit in such a case due to the curing and increase in volume of the resin. Faulty bonding is thus safely avoided.

With conventional mortar cartridges, the drill by which they are driven in has to be immediately switched off on reaching the lowest point of the borehole. If this happens too early, the anchor sits incorrectly and the adhesive mortar is not sufficiently mixed. If it happens too late, the mortar is displaced from the borehole. In contrast, the composite anchors of the present invention are not confined to use in blind holes, but instead may even be used in through-holes for example. Since the anchors do not have to be fitted by means of a drill, they may also be used in places where access is difficult. In addition, there is greater freedom in the design of the anchors. For example, hooks and eyes can be used.

So far as the construction of the composite anchor is concerned, there are two different embodiments. In the first embodiment (FIG. 1), a conventional anchor rod, 2, with a screwthread extending, for example, over its entire length is used. The rod is surrounded by a fiber-reinforced polyurethane resin, 3, and is embedded in the concrete or masonry, 1.

Figure 2:
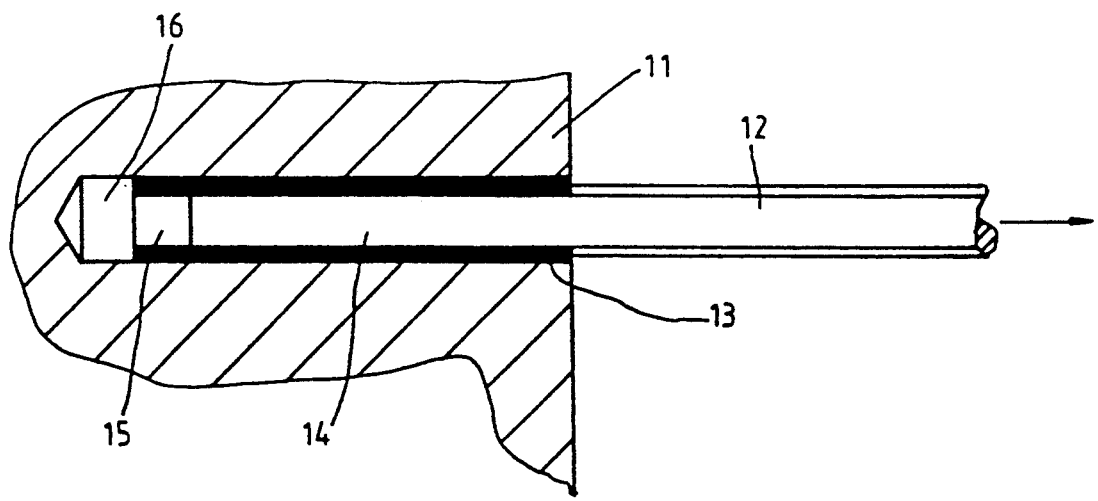
FIG. 2 represents a second embodiment of the present invention.

Particularly favorable load-bearing behavior can be achieved if a separation layer between the anchor rod and the polyurethane resin allows sliding so that the tensile force applied to the anchor rod is transmitted to a head in the innermost part of the bore (FIG. 2). Transmission of the force from the anchor rod to the resin-impregnated sheath is guaranteed by a positive connection at the head of the anchor rod. When the screw is tightened or under the effect of an operationally induced tensile force, the sheath adhering to the wall of the borehole is compressed so that, as with mechanical expansion dowels, a wedging effect is produced outside the outer peripheral zone which is critical on account of possible tensile flexural stresses.

The abovementioned separation layer represents an antiadhesive coating. This antiadhesive coating can be applied to the anchor rod. Any materials which are adhesive to polymethane resins can be used for this purpose, in particular polyolefins, silicones, fluoropolymers and waxes of synthetic or natural origin. The antiadhesive coating may also consist of a thin-walled sheath which is slidable in relation to the anchor rod and which prevents direct contact between the polymethane resin and the anchor rod. This sheath can for example consist of coated paper, plastic or metal films, tubes or pipes.

In FIG. 2, the concrete or masonry is represented by the numeral 11, a screwthreaded rod (anchor rod) is represented by the numeral 12 and is provided with an anchor head, 16. The fiber-reinforced polyurethane resin is represented by the numeral 13, and surrounds the rod up to the anchor head. An anti-adhesive coating, 14, is applied to a portion of the rod, with no coating applied to the front zone, 15.

According to the invention, suitable water-curing Polyurethanes include substantially any organic polyisocyanates known in the art. Suitable polyisocyanates include any compounds or mixtures of compounds containing at least two organically bound isocyanate groups per molecule. These include both low molecular polyisocyanates having molecular weights below 400 and modification products of such low molecular weight polyisocyanates having molecular weights (calculatable from the functionality and the content of functional groups) of 400 to 10,000, preferably 600 to 8,000 and, more preferably, 800 to 5,000. Suitable low molecular weight polyisocyanates include, for example, those corresponding to the formula:

$$Q(NCO)_n$$

where n=2 to 4, preferably 2 to 3, and q is an aliphatic hydrocarbon radical containing 2 to 18 (and preferably 6 to 10) carbon atoms, a cycloaliphatic hydrocarbon radical containing 4 to 15 (and preferably 5 to 10) carbon atoms, an aromatic hydrocarbon radical containing 6 to 15 (and preferably 6 to 13) carbon atoms or an araliphatic hydrocarbon radical containing 8 to 15 (and preferably 8 to 13) carbon atoms.

Specific low molecular weight polyisocyanates are, for example, hexamethylene diisocyanate; 1,12-dodecane diisocyanate; cyclobutane-1,3-diisocyanate; cyclohexane-1,3-and -1,4-diisocyanate and mixtures of these isomers; 1-isocyanato-3,3,5-trimethyl-5-isocyanatomethyl cyclohexane; 2,4-and 2,6-hexahydrotolylene diisocyanate and mixtures of these isomers; hexahydro-1,3- and/or -1,4-phenylene diisocyanate; perhydro-2,4'- and/or -4,4'-diphenyl methane diisocyanate; 1,3- and/or 1,4-phenylene diisocyanate; 2,4- and 2,6-tolylene diisocyanate and mixtures of these isomers; diphenyl methane-2,4'- and/or -4,4'-diisocyanate; naphthylene-1,5-diisocyanate; triphenylmethane-4,4',4''-triisocyanate or polyphenyl polymethylene polyisocyanates of the type obtained by phosgenation of aniline/formaldehyde condensates.

Suitable relatively high molecular weight polyisocyanates are modification products of these simple polyisocyanates, i.e. polyisocyanates containing, for example, isocyanurate, carbodiimide, allophanate, bioret or uretdione structural units which may be obtained by methods known in the art from the above-mentioned simple polyisocyanates corresponding to the above general formula. Among the relatively high molecular weight modified polyisocyanates, the isocyanate-terminated prepolymers known from polyurethane chemistry having molecular weights in the range from 400 to 10,000, preferably in the range from 600 to 8,000 and more preferably in the range from 800 to 5,000 are of particular interest. These compounds are obtained in known manner by reaction of excess quantities of polyisocyanates with organic compounds containing at least two isocyanate reactive groups, and more particularly organic polyhydroxyl compounds. Suitable polyhydroxyl compounds include both simple polyhydric alcohols, such as for example ethylene glycol, trimethylol propane, propane-1,2-diol or butane-1,2-diol, and preferably relatively high molecular weight polyether polyols and/or polyester polyols of the type known from polyurethane chemistry having molecular weights in the range from 600 to 8,000 and preferably in the range from 800 to 4,000 which contain at least 2, generally 2 to 8, but preferably 2 to 4 primary and/or secondary hydroxyl groups. It is of course also possible to use NCO prepolymers which have been obtained, for example, from low molecular weight polyisocyanates and less preferred compounds containing isocyanate-reactive groups, such as for example polythioether polyols, hydroxyl-functional polyacetals, polyhyroxypolycarbonates, hydroxyl-functional polyester amides or hydroxyl-functional copolymers of olefinically unsaturated compounds. Compounds containing isocyanate-reactive groups, particularly hydroxyl groups, suitable for the production of the NCO prepolymers are, disclosed by way of example in U.S. Pat. No. 4,218,543, column 7, line 29 to column 9, line 25. In the production of the NCO prepolymers, the compounds containing isocyanate-reactive groups are reacted with polyisocyanates at an NCO:OH equivalent ratio of >1. The NCO prepolymers generally have an NCO content of 2.5 to 30 and preferably 6 to 25% by weight. In the context of the present invention, "NCO prepolymers" or "isocyanate-terminated prepolymers" include both the reaction products as such and mixtures thereof with excess quantities of unreacted starting polyisocyanates which are often also referred to as "semiprepolymers".

According to the invention, particularly preferred polyisocyanate components are the polyisocyanates typically encountered in polyurethane chemistry, i.e., hexamethylene diisocyanate; 1-isocyanato-3,3,5-trimethyl-5-isocyanatomethyl cyclohexane (isophorone diisocyanate or IPDI(; 4,4'-diisocyanatodicyclohexyl methane; 4,4'-diisocyanatodiphenyl methane, and mixtures thereof with the corresponding 2,4'- and 2,2'-isomers; polyisocyanate mixtures of the diphenyl methane series of the type obtainable in known manner by phosgenation of aniline/formaldehyde condensates; modification products of these polyisocyanates containing biuret or urethane groups and, more particularly, NCO prepolymers of the above-mentioned type based on these polyisocyanates on the one hand and the simple polyols and/or polyether polyors and/or polyester polyols; and mixtures of these polyisocyanates. Isocyanates containing aromatically bound NCO groups are particularly preferred for the purposes of the invention. According to the invention, a particularly preferred polyisocyanate component is partly carbodiimidized diisocyanatodiphenylmethane which also contains uretoneimine groups through addition of monomeric diisocyanate onto the carbodiimide structure.

The water-curing polyurethanes may contain catalysts known in the art. These catalysts may be, in particular, tertiary amines which catalyze the isocyanate/water reaction and not a self-reaction (trimerization, allophanatization), cf. German Auslegeschrift 2,357,931. Examples of such catalysts are polyethers containing tertiary amines (German Auslegeschrift 2,651,089); low molecular weight tertiary amines, such as

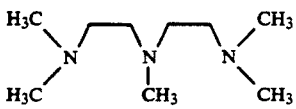

or dimorpholine diethyl ether or bis-(2,6-dimethylmorpholino)-diethyl ether (WO 86/1397). The catalyst content, based on tertiary nitrogen, is generally from 0.05 to 0.5% by weight, based on the polymer resin.

The water-curing polymer preparations may contain known additives, such as for example flow control agents, thixotropicizing agents, foam inhibitors and lubricants. The resins may also be pigmented or, if desired, may contain UV stabilizers. Suitable additives are, for example, polydimethyl siloxanes; calcium silicates of the Aerosil type; waxes (polyethylenes); UV stabilizers of the ionol type (German Auslegeschrift 2,921,163); pigments, such as carbon black, iron oxides, titanium dioxide or phthalocyanines.

Additives particularly suitable for polyurethane prepolymers are described in Kunststoff-Handbuch, Vol. 7, Polyurethane, pages 100 to 109 (1983). They are generally used in a quantity of 0.5 to 5% (based on the resin).

Suitable materials to be impregnated with the polyurethane include porous films or even foams of natural or synthetic materials (for example polyurethanes). Most preferably, however, the impregnatable material is a textile-based material preferably having a weight per unit area of 20 to 1,000 g/m² and more preferably from 30 to 500 g/m². The following are mentioned as examples of textile materials:

1. Woven or knitted textiles having a weight per unit area of 20 to 200 g/m² and preferably 40 to 100 g/m² and a filament count of preferably 2 to 20 filaments per centimeter in the longitudinal and transverse directions. The woven or knitted textiles may be produced from any natural or synthetic yarns. However, preferred woven or knitted textiles are those which have been produced from cotton yarns or from blended yarns which, in turn, have been obtained both from hydrophobic filaments or fibers having a high modulus of elasticity (for example polyester) and hydrophilic, natural or synthetic filaments or fibers (for example cotton or polyamide).

2. Woven or knitted glass fiber cloths with a weight per unit area of 60 to 500 g/m² and preferably 100 to 400 g/m² produced from glass fiber yarns with a modulus of elasticity of 7,000 to 9,000 (daN/mm²), and a filament count of 3 to 10 and preferably 5 to 7 in the longitudinal direction and 3 to 10 and preferably 4 to 6 in the transverse direction per centimeter woven glass fiber cloth, which have a longitudinal elasticity of 10 to 30% are preferred. The knitted cloths may be both sized and unsized.

3. Unbonded or bonded or needled fabrics based on inorganic and preferably organic fibers having a weight per unit area of 30 to 400 g/m² and preferably 50 to 200 g/m².

In the composite anchors of the invention coated with water-curing polyurethane resins, the support material is coated and/or impregnated with a quantity of 25 to 200% by weight and preferably 30 to 180% by weight of water-curing polymer preparation, based on the material as a whole.

The present invention also relates to a process for the production of water-curing polymer preparations for construction materials which is characterized in that a water-curing reactive resin is mixed with catalysts and other auxiliaries and additives and then homogeneously distributed over the surface of the support material.

The resulting support materials coated with water-curing polyurethane resin are then rolled onto the anchor rods which have been cut to size and are sealed in an airtight and water-tight foil (for example a plastic-/aluminium laminate) or other completely impervious containers of the type described in German Auslegungschriften 2,357,931, 2,651,089 and 3,033,569.

The anchor rod wrapped in the support material may also be coated with the water-curing polyurethane resin by immersion in the polyurethane resin, any excess adhering resin being allowed to drain off.

Both processes according to the invention are carried out in the absence of moisture, preferably in an atmosphere of <1% relative humidity at 21° C. and, more preferably, in an atmosphere of <0.5% relative humidity at 21° C.

For coating or impregnation, the polymer preparation may be dissolved in an inert solvent which is removed again after coating.

Suitable inert solvents are, for example, chlorinated hydrocarbons, such as methylene chloride, trichloroethane or chloroform; ketones, such as acetone and methyl ethyl ketone; esters, such as ethyl acetate and butyl acetate; aromatic hydrocarbons, such as toluene and xylene.

The invention is further illustrated but is not intended to be limited by the following examples in which all parts and percentages are by weight unless otherwise specified.

EXAMPLES

Example 1

Production of the Moisture-curing Polyurethane Resin 220 parts 4,4'-bis-isocyanatodiphenyl methane containing carbodiimide groups (NCO content 30%) are added at room temperature to a mixture of 56 parts of a polypropylene glycol, OH value 112, 38 parts of a trimethylolpropane-started polyether (propoxylated with 3.2% propylene oxide and subsequently ethoxylated with 96.8% ethylene oxide), 0.1 part benzoyl chloride and 6 parts 2,2'-dimorpholinodiethyl ether. The reaction mixture is spontaneously heated and is stirred until the isocyanate content is 15.6%. The prepolymer obtained has a density of 1.1 g/cm³ and a viscosity of $\eta_{25}$ of 3686 mPa.s.

Example 2

Production of a Glass Fiber Knit Fabric Impregnated with a Polyurethane Resin

To produce a glass fiber knit fabric impregnated with a polyurethane resin according to the invention (untreated: 9 cm in width, weight per square meter: 290 g/m²) a roll of the knit fabric was impregnated with a polyurethane resin of Example 1, dissolved in methylene chloride, in a quantity corresponding to 150% of the weight (based on the non-resin-impregnated carrier material). The solvent is then stripped off in vacuo. In this manner a resin-impregnated glass fiber knit fabric is obtained which can be wrapped around anchor rods which have been previously cut to size and pretreated, in order to produce the composite anchors according to the invention.

Example 3

Insertion of a Dowel According to FIG. 1

A hole 90 mm in depth and 12 mm in diameter was drilled into a concrete cube of strength class B 350 (edge length 20 cm) in the centre of one of the surfaces of the cube. A resin-impregnated glass fiber knit fabric produced according to Example 2 was wrapped around a conventional anchor rod according to FIG. 1 having a thread M 10 (DIN 13) and a total length of 130 mm, so that the anchor rod with the surrounding polymethane-resin-impregnated glass fiber knit fabric had a thickness of 12 mm (measured by a slide gauge); it was then immersed in tap water for 5 secs and immediately introduced into the borehole to a depth of 90 mm. After 24 hours a breaking force of 34.5 kN was determined in the pull-out test. The fracture took the form of a conical cavity in the concrete.

Example 4

Insertion of a Dowel According to FIG. 2

A composite anchor of the variant of FIG. 2 wrapped in the same resin-impregnated glass-fiber knit fabric was used in an analogous manner.
The anchor rod used had the following dimensions:
Anchor head:
  10 mm in length
  12 mm in diameter
Tapering:
  total length: 80 mm of which 70 mm had an antiadhesive coating
  diameter: 8 mm
Screw thread:
  M 10 DIN 13, Bl. 1 40 mm in length
Total length:
  130 mm The breaking force was 28.1 kN. The fracture occurred in the steel material of the anchor rod in the transitional area below the head in the innermost section of the hole. The antiadhesive coating consisted of a silicone-treated paper with the silicone-treated side on the outside which was bonded to the tapered section of the anchor rod by means of an adhesive strip, as shown in the figure.

What is claimed is:

1. A composite anchor comprising a rod sheathed in a material which has been impregnated with a moisture-curing polyurethane resin.

2. The composite anchor of claim 1, wherein the impregnated material is a woven, knitted, or nonwoven textile of natural or synthetic fibers.

3. The composite anchor of claim 2, wherein the fibers of the impregnated material are metallic or mineral fibers.

4. The composite anchor of claim 3, wherein said fibers are glass fibers.

5. The composite anchor of claim 1, wherein said rod is constructed of a metallic material or a fiber composite.

6. The composite anchor of claim 5, wherein said rod is constructed of unalloyed or alloyed steel.

7. The composite anchor of claim 1, wherein said rod is provided with screwthreads over the entire length thereof.

8. The composite anchor of claim 1, wherein a portion of said rod is provided with anti-adhesive coating.

9. A process for the production of a composite anchor comprising impregnating a material with a water-curing polyurethane resin, sheathing a rod with the impregnated material, and packaging the resultant product in a watertight container.

* * * * *